United States Patent [19]

Busch

[11] 3,772,476

[45] Nov. 13, 1973

[54] DIGIT IMPULSE SCANNING ARRANGEMENT FOR A COMMUNICATION SWITCHING SYSTEM

[75] Inventor: John F. Busch, Clarendon Hills, Ill.

[73] Assignee: GTE Automatic Electric Laboratories Incorporated, Northlake, Ill.

[22] Filed: Apr. 19, 1972

[21] Appl. No.: 245,463

[52] U.S. Cl. ........................ 179/18 EB, 179/16 AA

[51] Int. Cl. ........................................... H04m 3/22

[58] Field of Search ...................... 179/16 E, 16 EA, 179/16 EC, 16 H, 18 EB, 18 FF, 16 AA; 340/413

[56] References Cited

UNITED STATES PATENTS

| | | | |
|---|---|---|---|
| 3,301,963 | 1/1967 | Lee | 179/18 EB |
| 3,659,055 | 4/1972 | Witmore | 179/16 E |
| 3,562,436 | 2/1971 | Lutgenau | 179/18 FF |

*Primary Examiner*—Kathleen H. Claffy
*Assistant Examiner*—David L. Stewart
*Attorney*—Kurt Mullerheim et al.

[57] ABSTRACT

The validity of individual impulses in the dial pulse mode of signaling is determined, and both false breaks and false makes are rejected, in a system in which a pulse repeating relay in a digit receiver has its contacts connected to a scanner, which for nominal 10 pulse per second dial pulse signaling, samples the signal at the relay contacts once every 10 milliseconds. The common logic and memory circuits associated with the scanner are arranged to record the occurrence of two break samples followed by two dead periods in succeeding cycles which are recorded independently of whether break or make samples have been detected, following which a make sample occurring within 100 milliseconds indicates a valid impulse. Short impulses of approximately 2 milliseconds or less are rejected by the relay not responding thereto.

7 Claims, 11 Drawing Figures

DIALED DIGIT REGISTRATION & SUPERVISION
(RRC)

RS MEMORY LAYOUT

DIGIT IMPULSE SCANNING ARRANGEMENT FOR A COMMUNICATION SWITCHING SYSTEM

BACKGROUND OF THE INVENTION

1. Field of the Invention

This invention relates to a pulse scanning arrangement for use in a communication switching system, such as a telephone switching system, and it more particularly relates to an arrangement for a communication switching system to detect a train of impulses and to discriminate against spurious or false pulse conditions.

2. Description of the Prior Art

In order to prevent the erroneous detection of false or spurious pulse conditions, it has been proposed to provide electronic telephone switching systems with pulse detection arrangements which would discriminate against certain kinds of spurious pulse conditions. In this regard, redundant pulse-detecting arrangements have been proposed, whereby a calling line would be scanned at least twice during a break and twice during a make of a dial impulse to insure that the signal being detected is a genuine dial impulse and not merely a spurious pulse condition caused by transients or the like. However, such pulse detection arrangements would not be entirely satisfactory for some applications unless a very high scanning rate were used, in that there are a variety of different causes for spurious pulse conditions, some of which would be erroneously detected and identified as being a genuine dial impulse if such an arrangement were employed. In addition to spurious pulses of a short duration, such as a pulse of a duration equal to or less than two milliseconds caused by transients occurring at the make or break period of a dial pulse, longer false pulses, such as pulses of a duration of 8 milliseconds or less, could also occur before or after a transistion between a make and a break period during dialing, such as a false make pulse at the first one-third of the break period of a dial pulse and false break pulses before dial pulsing, at the interdigital period or after dial pulsing. The causes for spurious pulses include poorly adjusted dials, large amount of capacitive leakage with a short line, trunk circuit pulsing, contact bounce and others. For certain applications, proposed pulse detection arrangements could erroneously detect spurious pulses and falsely identify them as being valid pulses. Accurate pulse detecting is also made more difficult to achieve with proposed arrangements in certain circumstances, since dial pulses are not always faithfully and accurately repeated, especially where the pulses are repeated several times when tandem switching is required. Therefore, pulse detection arrangements for telephone switching systems are required to detect dial pulses over a wide range of duty cycles or pulse ratios, and of frequencies. For example, the ability to detect dial pulse trains having pulse ratios of 29 to 83 percent break and frequencies of 8–12 pulses per second is desirable for some applications. As a result, the problem of accurately detecting dial pulses is compounded, and thus it would be highly desirable to have a pulse detection arrangement which would detect valid pulses only and would discrimimate against such false or spurious pulses in an efficient and economical manner.

SUMMARY OF THE INVENTION

The object of this invention is to provide a new and improved arrangement for a communication switching system to detect pulses accurately and to discriminate against false or spurious pulses in an efficient and economical manner.

According to the invention, an arrangement is provided for detecting a series of impulses in the form of a series of first and second conditions by sampling them during periodic time intervals. The impulses are received from a communication switching system line, the first condition being a normal condition of the line and the second condition being an impulse. A valid pulse is identified after detecting N number of samples of the second condition and M number of samples of either the first or second conditions followed by one sample of the first condition within a predetermined time interval thereafter.

CROSS-REFERENCES TO RELATED PATENTS AND APPLICATIONS

The invention claimed herein is disclosed in U.S. Pat. application Ser. No. 201,851 filed Nov. 24, 1971, now U.S. Pat. No. 3,737,873 issued June 5, 1973, by S. E. Puccini for a DATA PROCESSOR WITH CYCLIC SEQUENTIAL ACCESS TO MULTIPLEXED LOGIC AND MEMORY, hereinafter referred to as the REGISTER-SENDER patent application. However, applicant of the present application is the inventor of the matter claimed herein, which matter was disclosed to the applicant of the REGISTER-SENDER patent application during the design of the subsystem.

The special pulse-repeating relay is disclosed in detail in U.S. Pat. No. 3,492,613 issued Jan. 27, 1970 by H. W. Van Husen for REED RELAYS HAVING AIDING COILS TO COUPLE HIGHLY INDUCTIVE OPERATING COILS TO REED BLADES, is hereinafter referred to as the BATTERY FEED RELAY patent.

DESCRIPTION OF THE PREFERRED EMBODIMENT

The subsystem in which the invention is incorporated is described in said REGISTER-SENDER patent application. FIGS. 2, 3, 5, 9 and 10 herein correspond respectively to FIGS. 2, 11, 5, 8 and 21 in that application, which may be referred to for further description.

Figure 1:
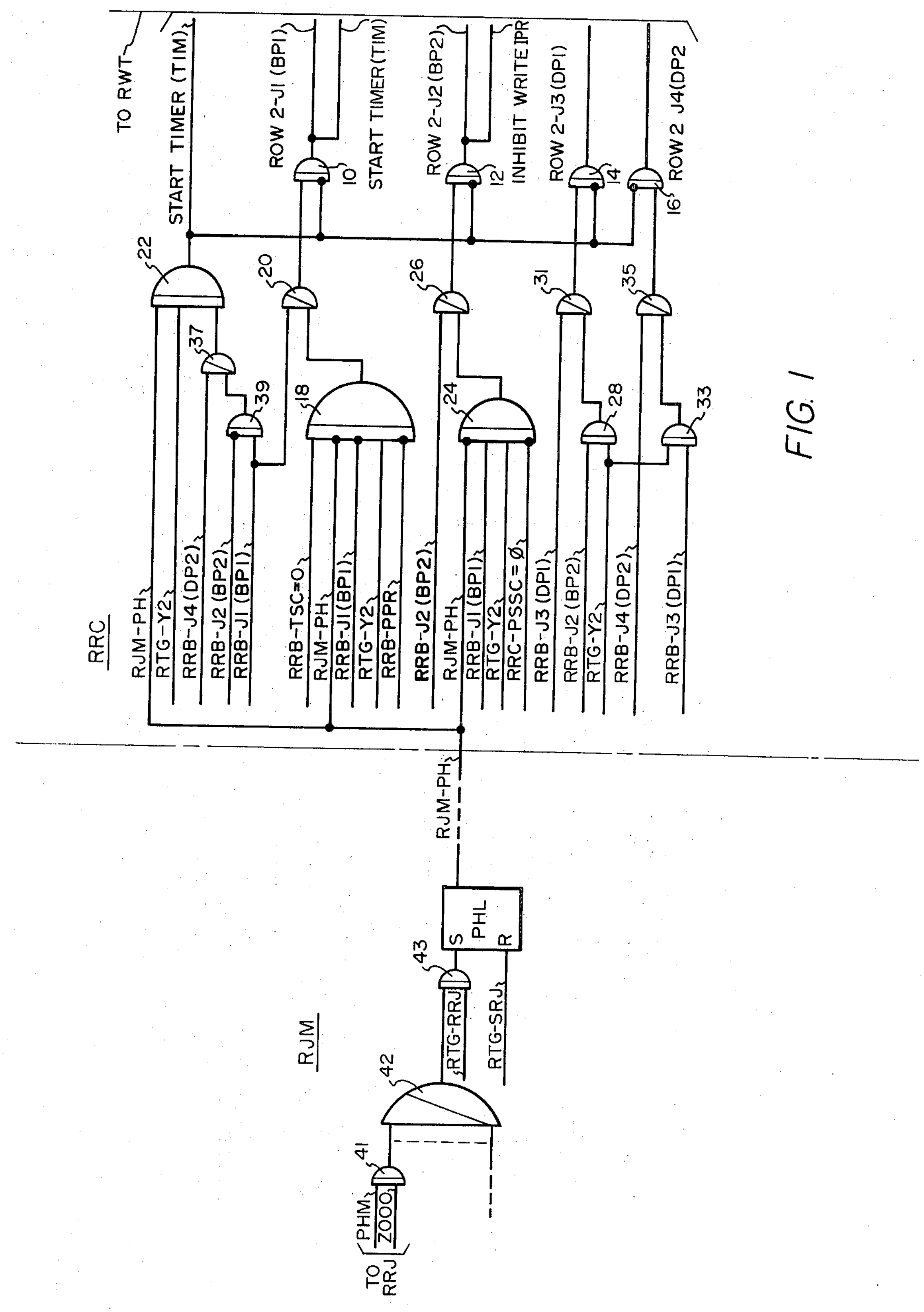
FIG. 1 is a functional block diagram of portions of the register controller and the register multiplex unit incorporating the preferred embodiment of the invention.

Referring now to FIG. 1 of the drawings, there is shown a portion of the register controller RRC for detecting dial pulses in accorance with the present invention. A set of four AND gates 10, 12, 14 and 16, when energized, cause information to be stored via the write transfer RWT in a memory RCM of the system shown in FIG. 2 of the drawings. As hereinafter described in greater detail, the gate 10, when energized, causes information designated as BP1 (break pulse one) to be stored in position J1 of row two of the memory RCM when the break period of a dial pulse to be detected causes the signal via lead RJM-PH to become false during the sub-time slot Y2, whereby an AND gate 18 is energized to activate an OR gate 20, which in turn causes the gate 10 to be energized and thereafter to be repeatedly energized during subsequent Y2 sub-time slots until AND gate 22 inhibits the gate 10. The gate 12 is energized to cause information designated as BP2 (break pulse two) to be stored in the memory at row 2, position J2, thereof when the next Y2 sub-time slot occurs and the break period of the dial pulse is still present with the information BP1 having been stored in the memory to cause the energization of an AND gate 24, which in turn energizes an OR gate 26 to activate the gate 12, the gate 26 causing the gate 12 to be repeatedly energized during subsequent Y2 sub-time slots until the gate 22 inhibits the gate 12. When energized, the gates 14 and 16 cause information designated as DP1 and DP2 (dead periods one and two) to be stored in positions J3 and J4 of row two of the memory, respectively. In this regard, during the Y2 sub-time slot following the storage of the BP2 information, AND gate 28 energizes an OR gate 31, which in turn energizes the gate 14 and repeatedly energizes it during subsequent Y2 sub-time slots until the gate 22 inhibits the gate 14. Similarly, during the next Y2 sub-time slot, AND gate 33 energizes OR gate 35 to cause the gate 16 to the activated repeatedly until the gate 22 inhibits it.

The AND gate 22 is activated in response to the make period of the dial pulse during a subsequent Y2 sub-time slot and to an OR gate 37 energized when either the information DP2 has been stored previously or the AND gate 39 is energized in response to the information BP1 having been stored and to the information BP2 not having been stored. The Y2 sub-time slot occurs every 10 milliseconds, and therefore the line producing the dial pulses is scanned once every 10 milliseconds. Thus, as hereinafter described in greater detail, a valid pulse is determined after two dialing break periods have been detected and after storing the dead period information DP1 and DP2, whereby a valid pulse is detected 30 milliseconds after the break, period is first detected to eliminate the possibility of erroneously detecting a spurious pulse occurring at that time. When a valid pulse is detected, the information stored in the memory is cleared therefrom upon detecting the next make period of the dial pulse train. If the break period of the pulse train is detected only once and is not detected during two consecutive Y2 sub-time slots, the information is cleared from the memory to indicate that a valid pulse has not been detected.

GENERAL SYSTEM DESCRIPTION

Figure 2:
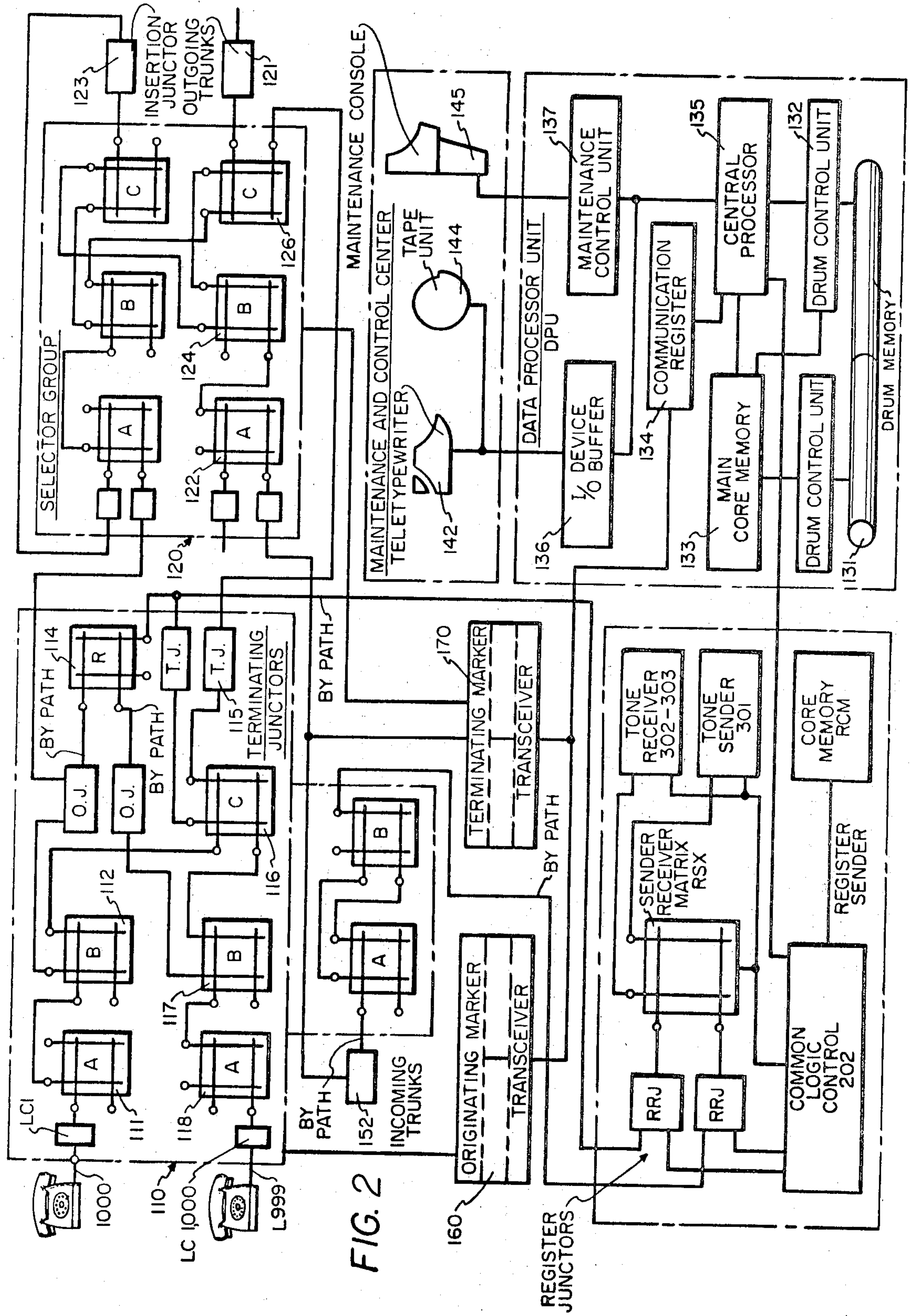
FIG. 2 is a block diagram of a communication switching system incorporating the preferred embodiment of the invention.

The telephone switching system is shown in FIG. 2. The system is disclosed in said system patent application, and also in said REGISTER-SENDER patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 160 control the switching networks of the selector group 120 for establishing connections therethrough; and if a call is to be terminated at a local customer's line in the office then the terminating marker sets up a connection through both the selector group 120 and the line group 110 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctures via a register receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 co-operate with a main core memory 133 and control the drum 131. A central processor 135 accesses the register sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating at a local line and remains in the connection for the duration of the call.

The selector group 120 is the equipment group which provides intermediate mixing and distribution of the traffic from various incoming trunks and junctors or its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunkgs 152 and register junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with pecial input-output and maintenance features which enable it to process data. The data processing unit includes control of: the originating process communication (receipt of line identity, etc.), the translation operation, route selection, and the terminating process communication. The translation operation includes: class-of-service loop-up, inlet-to-directory number translation, matrix outlet-to-matrix inlet translation, code translation and certain special feature translations.

TYPICAL CALLS

This part presents a simplified explanation of how two basic call types are processed by the system. The following call types are covered in the order listed: (1) call from a local party served by one switching unit to another local party served by the same switching unit, and (2) call from a local party served by a switching unit destined for a party served by a distant office, via an outgoing trunk.

In the following presentations, reed relays are referred to as correeds. Not all of the data processing operations which take place are included.

LOCAL LINE-TO-LOCAL LINE CALL

When a customer goes off-hook, the D.C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and set to the data processor unit via its communication transceiver.

While sending line number identity (LNI) and route data to the data processor, the marker operates and tests the path from the calling line to the register junctor. The closed loop from the calling station operates the register junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the core memories of both the register-sender and the data processor, and is used to identify the call as it is processed by the remaining call processing programs.

Once the register junctor identity is known, the data frame is stored in the data processor's call history table (addressed by register junctor number), and the register-sender is notified that an origination has been processed to the specified register junctor.

Upon detecting the pulsing highway and a notification from the data processor that an origination has been processed to the specified register junctor, the central control circuits of the register-sender sets up a hold ground in the register junctor. The marker, after observing the register junctor hold ground and that the network is holding, disconnects from the matrix. The entire marker operation takes approximately 75 milliseconds.

Following the register junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register junctor.

Before the transfer of data to the register-sender memory takes place, the class-of-service information is first analyzed to see if special action is required (e.g., non-dial lines or blocked originations). The register junctor is informed of any special services the call it is handling must have. This is accomplished by the data processor loading the results of the class-of-service translation into the register-sender memory words associated with the register junctor.

After a tone receiver connection (if required), the register junctor returns dial tone and the customer proceeds to key (touch calling telephone sets) or dial the directory number of the desired party. (Party test on ANI lines is performed at this time.)

The register junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing function. The major inputs for this phase are the dialed digits receiving by the register-sender and the originator's class-of-service which was retrieved and stored in the call history table by the originating process phase. The originating class-of-service and the routing plan that is in effect is used to access the correct data tables and provide the proper interpretation of the dialed digits and the roper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the detailed call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g., ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processor function. The following paragraphs describe the three-way interworking of the data processor, terminating marker, and the register-sender as the data frame is sent to the terminating marker, the call is forwarded to the called party and terminated.

A check is made of the idle state of the data processor communication register, and a terminating marker. If both are idle, the data processor writes into register-sender core memory that this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory slot and releases itself from the call. The dedicated call history table (for that registor) in the data processor core memory is returned to idle.

LOCAL LINE-TO-OUTGOING TRUNK CALL

The processing of a call originated by a local customer, but destined for a distant office, is handled the same as previously described for a "local-to-local" call up to the point where a three-digit translation has occurred. The digits are analyzed and it is determined that the call destination is not a local line. Operation from this point forward is described in subsequent paragraphs.

For this example, the call is originating from a rotary dial line. The customer is making a seven-digit EAS (extended area service) call requiring tandem switching through the connecting office. The connecting office is equipped for wink-start pulsing. The trunk to the connecting office is an E and M trunk requiring D.C. pulsing.

The routing information and the class of the calling party allows the data processor to determine all register-sender instructions necessary to forward this call toward its destination.

The data processor writes the sending requirements into the register-sender core memory fields. These include the following information and instructions for this example: (a) early outpulsing of all digits received, (EOP field is set), (b) when seven digits are received, dialing is finished (TL field is set equal to 7), (c) close terminating loop in the register junctor, and (d) working with the terminating marker. There are also other instructions relating to start signals, send mode, etc.

The network switching instruction is sent to the terminating marker via the communication register. The marker then makes various tests, selects a selector outlet, and completes a path thereto. When the marker recognizes that the path has been connected properly, it clears from the matrix and sends a message to the data processor indicating successful call completion, and the identity of the trunk that was used.

The data processor will place this information in the call history table and write into register-sender core memory that outpulsing may proceed when start signals have been received. When the distant office is prepared to receive digits, it will return an off-hook signal of approximately 150 milliseconds which the outgoing trunk converts to a ground on the S lead. This causes the stop dial (SD) relay in the register junctor to operate. At the end of the 150-millisecond period, the SD relay restores and outpulsing begins.

The register-sender will outpulse the digits accumulated at this point (early outpulsing) and will outpulse each additional digit as it is received from the customer (no digits are deleted or prefixed in this example). When seven digits have been accumulated and sent, the register-sender will signal the originating junctor to switch through.

The register junctor will release itself from the call, releasing the R matrix. The register-sender memory is cleared, and the call history table in the data processor is reset. The calling party now controls the outgoing trunk. When the called party served by the connecting office answers, they may begin to converse. The calling line is now connected to the connecting office via the line matrix, originating junctor, selector matrix, and outgoing trunk.

When the calling party disconnects, the outgoing trunk releases the selector matrix, releasing the originating junctor and line matrix. Release of the line cut-off correed idles the customer's line for future calls.

The outgoing trunk remains busy for a short time to insure release of the connecting office. It then returns to idle.

SYMBOLISM FOR GATES AND BISTABLE DEVICES

The common logic circuits of the register-sender subsystem are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the output of each connected to an input of the other, which makes the circuit a bistable device. The logic also uses bistable devices in the form of JK flip-flops implemented with integrated circuits.

Relay units such as the register junctors include interface circuits for signals to and from the electronic frames. These interface circuits are relay drivers and test gates as shown for example at the bottom of FIG. 3. These circuits use discrete transistors rather than integrated circuits. Relay drivers shown as triangles function as switches to operate the relays. Those designated MGS are main ground switches comprising two transistors connected so that when a true signal is applied at the input, ground potential from the main battery is connected via the emitter-collector path of the output stage in saturation to a relay; those designated MBS are main battery switches connected so that with a true signal at the input the negative terminal of the main battery is connected via the emitter-collector path of the output stage in saturation to a relay; those designated FRS are fast-release relay switches comprising two transistors, such that when a true signal is applied to the input the two output leads from the collectors of two transistors connected to the two sides of the relay winding supply a low impedance path to operate the relay; and those designated LBS for low current battery switch comprise a single transistor which when a true signal is applied at the input supply a low impedance path including the collector-emitter path to operate the relay. The contact test gate designated by CTG is a circuit which when ground is supplied via relay contacts at its input supplies a true signal at its output.

REGISTER JUNCTOR AND ORIGINATING PATH

Figure 3:
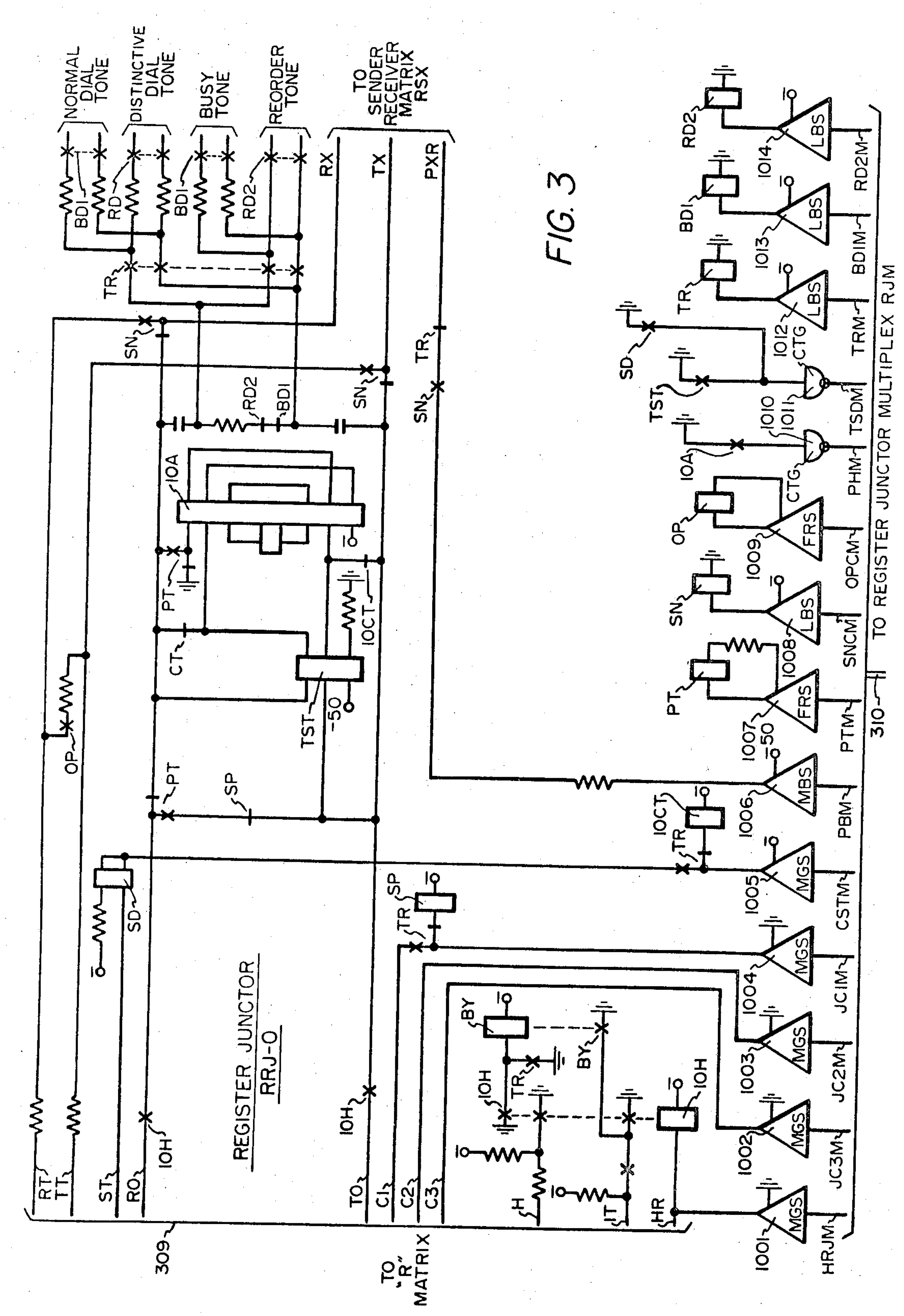
FIG. 3 is a schematic and functional block diagram of a register junctor of the system of FIG. 2.

A diagram of a register junctor RRJ-0 is shown in FIG. 3. The register junctor's function is the interface between the subscriber liens and incoming trunks, and the time-shared circuits of the register-sender. The register junctors are used for digit receiving or sending, tone application, a battery feed device to the calling station, party and coin testing, busy and idle indication to the originating marker, and as a source of hold for the matrix path.

There are two types of register junctors; the local register junctors used with the R stage outlet to subscriber lines and paystations, and incoming register junctors used with incoming trunks and having less complexities than the local registor junctors.

The register junctor RRJ-0 shown in FIG. 3 is a local register junctor.

Relay 10H is a reed relay (correed). It is energized by the originating marker applying ground potential to the HR lead. Contacts of this relay connect the tip and ring leads T0 and R0 to relay 10A, close a path to operate relay BY, which in turn has contacts to apply ground to the IT lead and via a path not shown lights a busy lamp. Contacts of relay 10H also supply ground potential to lead H to hold the originating connection. Relay 10H releases after the register-sender receives specific instructions from the data processing unit that the terminating marker has completed its function which will cause the register junctor to eventually be released.

Figure 5:
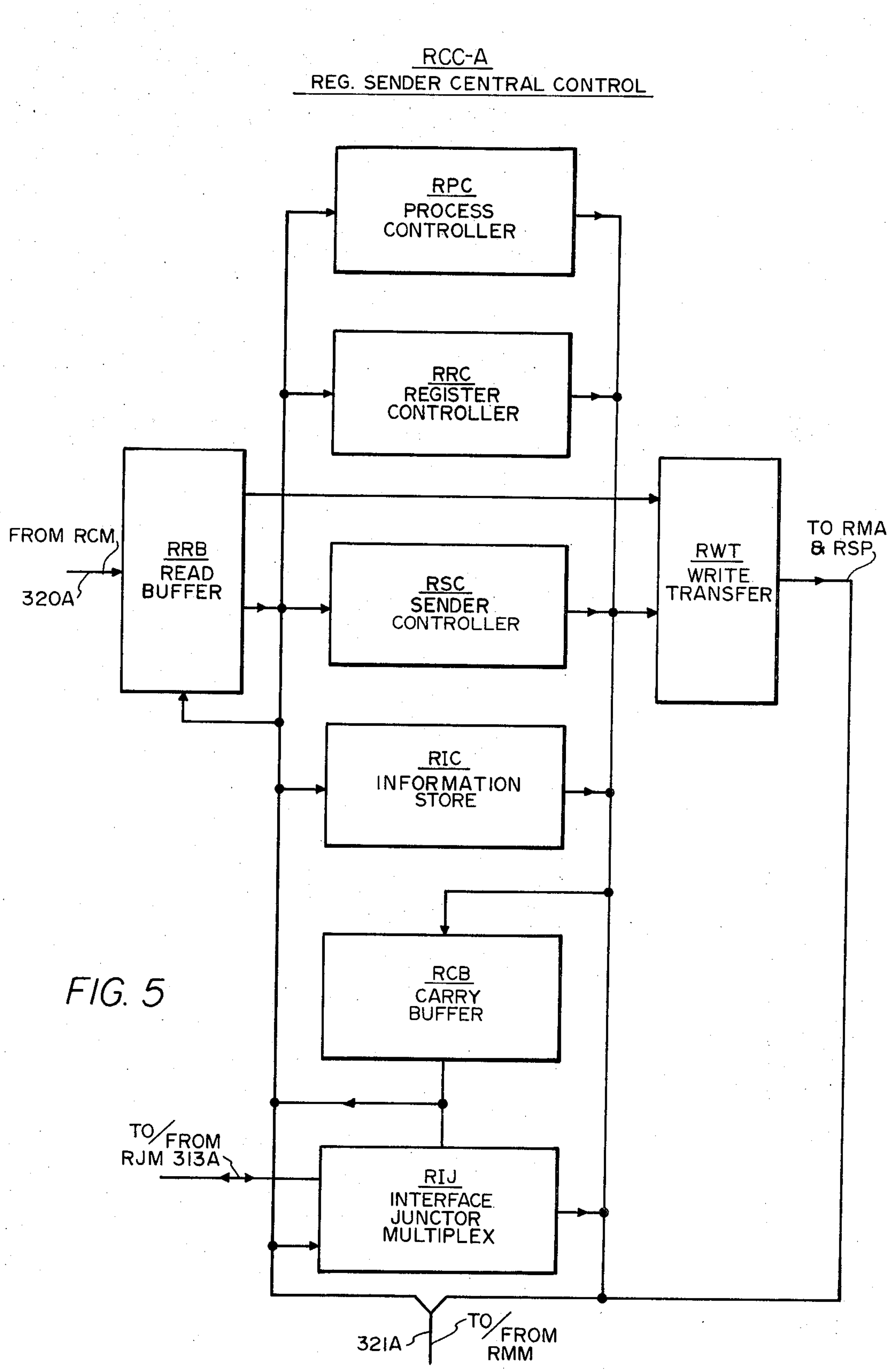
FIG. 5 is a block diagram of a central unit for arranging information to be stored in the memory and includes the register controller, a portion of which is shown in detail in FIG. 1.

Relay 10A is a single reed relay with three windings, as disclosed in said BATTERY FEED RELAY patent. When used as a pulse-repeating battery feed relay, relay 10A is operated under the control of the subscriber loop (or trunk) via the tip T0 and ring R0 leads. The relay 10A avoids detecting short duration spurious pulse condition as hereinafter described in greater detail. After relay 10H has operated connecting the register junctor to the subscriber line, with the telephone at the subscriber station off-hook closing the path between the T and R relays, relay 10A operates. Contacts of this relay supply ground to a contact test gate 1010, which generates a true signal on lead PHM (pulsing highway) which via the multiplex circuits is supplied to the register controller RRC (FIG. 5). During the reception of dialed digits relay 10A follows the dial pulses which are therefore repeated via lead PHM to the common logic circuits. When relay 10H releases during sequence state PSS=13, relay 10A is also released.

Relay 10CT is a reed relay. This relay is controlled by the TSC (test sequence counter) in memory. It is operated for 10 milliseconds while performing a coin test or party test. While it is operated it includes the TST relay in the test path from the relay 10A and source battery, to the ground provided for the subscriber equipment.

Relay PT shown in FIG. 3 as a single relay actually comprises two mercury wetted reed relays in parallel, operated by the same fast release relay switch 100 under control of a signal on lead PTM. They are operated for 30 milliseconds for control of the path for coin and party tests.

For an explanation of the remaining relays and other components of the register junctor, reference may be made to the REGISTER-SENDER patent application. An incoming register junctor is similar to the local register junctor described above except that relays TST, 10CT, PT, RD2, and SP are omitted.

BATTERY FEED RELAY

Figure 4:
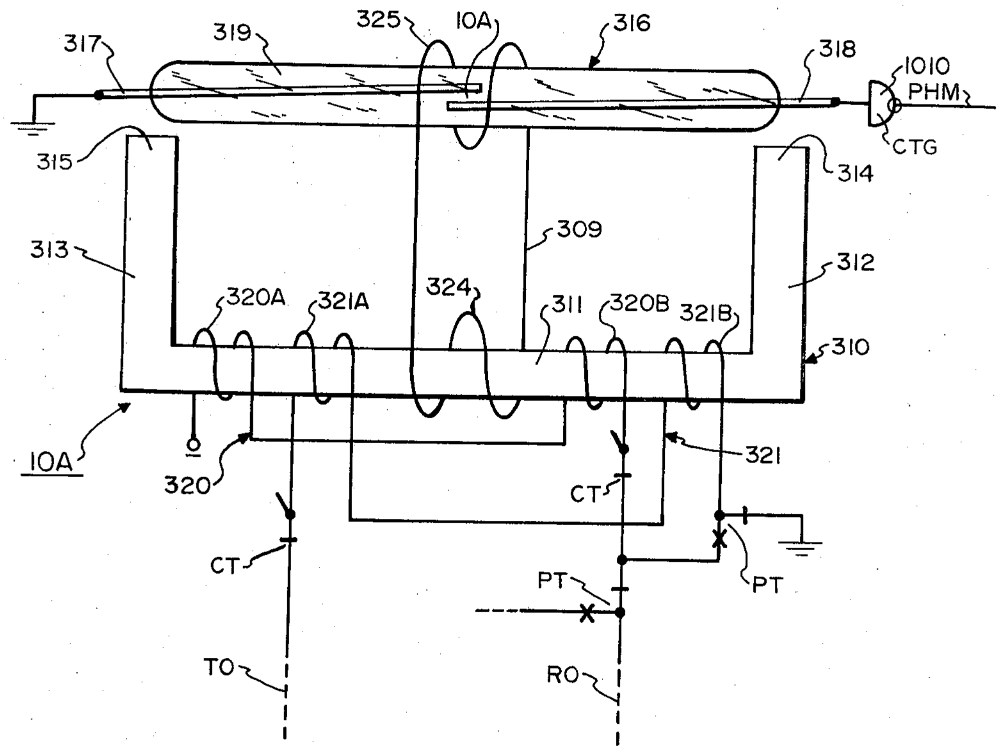
FIG. 4 is a schematic representation of the dial pulse-repeating relay of the register juncture having a closed-loop auxiliary winding, illustrating in a simple manner the principle upon which the relay is constructed and its connection to the register multiplex unit.

Referring now to FIG. 4, the battery feed relay 10A of FIG. 3 serves the dual function of a battery-feed, pulse-repeating relay and of a current-limiting resistance during party and coin detection operations. The principle of operation of the relay 10A is disclosed in the BATTERY FEED RELAY patent, which may be referred to if additional information is desired. The relay 10A includes an additional or auxiliary winding or coil 309 which aids in the accurate reproduction of dial pulses. The relay 10A does not respond to short duration spurious pulse conditions, such as pulses of 2 milliseconds or less, since its inductance does not permit it to operate in less than 2 milliseconds.

The relay 10A comprises a U-shaped iron core 310 having bight portion 311 and legs 312 and 313. Adjacent the ends 314 and 315 of legs 312 and 313, respectively, is located a reed switch device 316. The reed switch device is of the usual type including a pair of magnetic reed blades 317 and 318, which when subjected to a magnetic field, close to complete the external circuit connected thereto. The blades, as can be seen, are sealed in a closed, insulated chamber 319, normally constructed of a vitreous material. The U-shaped core shown in the drawings is not essential to the invention; however, it is preferred because it provides a better concentration of the magnetic operating field at the reed switch than does a conventional parallel, straight-line core.

A pair of operating coils 320 and 321 wound about the bight comprise pairs of winding portions 320A and 320B and 321A and 321B, respectively, each of the winding portions being wound in the same direction as illustrated in FIG. 4. When the relay 10A in serving to follow dial pulses with the relay PT unoperated and a make portion of a dial pulse occurs, current flows from ground via a path including the PT transfer contacts, the portions 321B and 321A, the normally-closed CT contacts, the lead To, the preceding equipment and the subscriber's closed loop, the lead R0, the PT transfer contacts, the normally-closed CT contacts and the portions 320B and 320A to the negative battery terminal to energize the operating coils, which thereby serve to produce, through iron core 310, the necessary magnetic field to operate the reed switch 316. The additional coil 309 which serves as a magnetic coupling means is wound about both the reed switch 316 and the iron core 310, shown here on the bight portion 311, such that upon the energization of de-energization of coils 320 and 321, a change in the magnetic field of core 310 results, which in turn, causes a voltage to be induced into portion 324 of the coil 309. This induced voltage causes current to flow in coil 309, which produces a momentary magnetic field at the tertiary portion 325 thereof, wound about the reed switch 316. The magnetic energy from this momentary field or flux, depending on the sense in which coil 309 is wound about the iron core and the reed switch with respect to the manner in which the operating coils are wound about the core aids the operating magnetic field created upon the energization of the operating coils. For example, coil 309 is wound about iron core 310 and reed switch 316 in such a manner as to assist the operating magnetic field, the induced momentary magnetic field will cause the reed switch 316 to close more quickly and positively. Furthermore, upon the deenergization of the operating windings, i.e., upon the opening of the subscriber's line, an opposing magnetic field is produced in the manner explained above, which tends to quickly spring the reed blades apart. Thus, through the addition of this extra coil acting as a magnetic coupling means, a normally open reed switch device which might tend to remain closed upon the deenergization of the operating coils can be made to be opened promptly and efficiently. Thus, the relay 10A accurately and faithfully follows and repeats the dial pulses from the calling line.

REGISTER-SENDER CENTRAL CONTROL

The read buffer RRB is a 52-bit register. This circuit is used for temporary storage of two words from a row of the register core memory. The registers are latch circuits that make the data available to the controller circuits, the carry buffer circuits, and the write transfer circuits. The latches correspond to the positions of memory, and are designated RRB-A1 through RRB-L4.

The write transfer circuit RWT comprises 48 bit selective input devices. There are eight pairs of inputs and a clear memory circuit used to present data to the memory access circuits RMA. The write transfer circuits RWT can have as its source the different controllers shown in FIG. 5, the read buffer, and for clear memory the carry buffer RCB. The outputs from the write transfer circuit RWT are multiplexed with other sources by circuit RMA for writing into the core memories RCM.

The process controller RPC is used to control the process of a call. This unit takes information from the first row of a core memory block and information from the register junctors via the multiplex circuit RJM and RIJ. The controller RPC furnishes much of its data to the carry buffer RCB for controlling other memory word operations. Changes of this processing information are restored to the memory during sub-time slot Y9. The RPC processor also generates the call processing interrupts to the data processing unit.

The register controller RRC is used to manipulate register junctor information, primarily for call origination functions. This unit takes its information from row two of the memory or from the carry buffer RCB. The processor RRC controls the dial tone application, party testing, digit reception, and start dial signal controls. The results of the data from the RRC processor are used for manipulation in other controllers via the carry buffer RCB, for origination identification from the register junctors via the multiplex circuits RJM, via the multiplex circuits for digit reception, or is written back into memory for storage and later use.

The sender controller RSC is used to manipulate register junctor information primarily for call termination and sending functions. The processor RSC deals with information found in row three of the memory. This controller contains information as to start dial signals, method of digit sending, the digit being sent and the pulse count that has been sent of pulse digit; and the sequence of digit sending as to prefix digits; called number and calling number information.

The information storage controller RIC is used for data manipulation in rows 4, 5, 6, 7, and possibly 8 of the memory. The information that is handled consists of digit loading, shifting, retrieval and pattern recognition to and from appropriate places in core memory. Further data is used to set up special actions when particular conditions are recognized.

The carry buffer RCB is a series of latch circuits. There are 60 carry buffer latches. The majority of these latches are used to transfer bits of information from one call processing controller to another controller during different sub-time slots of a time slot period. The normal carry buffer information is not carried over from one time slot to another with exception of the BY latch, which indicates that a sender of receiver connection is in progress and prevents any other from attempting a connection until completion of the first.

The interface junctor multiplex unit RIJ operates with the junctor multiplex circuits RJM, the pertinent portion of which is whown in FIG. 1, for multiplex to and from the register junctors.

DIAL IMPULSE DETECTION

Referring now to FIGS. 1 and 6–9 of the drawings, the logic circuitry for detecting dial pulses is shown in FIG. 1 and forms a part of the register controller RRC of FIG. 5. As shown in FIG. 1, the outputs of the gates 10, 12, 14 and 16 are connected to the write transfer RWT to cause the respective information BP1, BP2, DP1 and DP2 to be written into the positions J1, J2, J3 and J4 of row 2A of the memory RCM, as shown in FIG. 10 of the drawings.

The gate 10 is energized in response to the gate 18 which is activated initially by the lead RJM-PH during break intervals of dialing and by the sub-time slot lead RTG-Y2. The scanning arrangement of the register junctor multiplex RJM is shown in simplified form in FIG. 1, which shows a single scan latch, whereas there are actually separate scan latches for groups of register junctors with their outputs ORed to lead RJM-PH. As shown in FIG. 1, the lead RJM-PH extends from the register multiplex unit RJM and is connected to the output of a latch PHL, which is set in response to an AND gate 43, which in turn is energized by the pulse highway lead PHM from the register junctor and an AND gate 41 via Or gate 42. For scanning other register junctors there are AND gates like gate 41 connected as other inputs of OR gate 42. The latch PHL is reset in response to the signal on lead RTG-SRJ. As more fully described in the REGISTER-SENDER patent application, the signals on leads RTG-SRJ and RTG-RRJ determine the time interval during each time slot at which the latch may be reset and set, respectively. The lead ZOOO designates the particular register junctor. Thus, the latch PHL may be set at the beginning of a time slot and reset at the end thereof, whereby the dial impulses may be scanned or sampled once every time slot. The lead RJM-PH is true during make periods of the dialing, and is false during dialing break periods.

The gate 18 is inhibited by the lead RRB-J1 from the read buffer RRB after the information BP1 had been written in the memory uring the preceding time slot, the signal on lead RRB-J1 also being used to energize the gate 20. The signal on lead RRB-PPR inhibits the gate 18 when the information PPR designating a prevent pulse reception condition is written in position B3 of row 2A of the memory, as shown in FIG. 10. The PPR bit is set at the same time as a start dial signal is sent to an incoming trunk. The lead RRB-TSC=0 indicates that the test sequence counter information TSC stored in positions H1 and H2 of row 2B of the memory (FIG. 6) is not in the process of controlling either a party or a coin detection test.

The gate 12 is either energized in response to the gate 24 which is primarily energized by the lead RJM-PH indicating a break period and by the lead RRB-J1 indicating that the information BP1 had been previously stored in the memory, or in response to the lead RRB-J2 from the read buffer when the information BP2 had been written into the memory previously. The gate 18 is energized during sub-time slot Y2 only, and is inhibited by the lead RRC-PSSC=$\phi$, which is a call processing sequence state indication from the register controller indicating that the idle condition is true and thus pulse detection is not required, and which is one of the PSS processing sequence state information stored, as shown in FIG. 6, in positions G1-4 of row 1B of the memory.

The gate 14 responds to either the gate 28 during subtime slot Y2 when the lead RRB-J2 indicates that the information BP2 had been stored in the memory, or to the lead RRB-J3 indicating that the information BP1 had been written into the memory previously. Similarly, the gate 16 is either activated when the gate 33 is energized by the leads RTG-Y2 and RRB-J3, or when the lead RRB-J4 indicates the previous storage of the DP2 information in the memory. It should be noted that neither one of the gates 14 and 16 is controlled by the pulse highway lead RJM-PH, and thus they serve only to provide a delay or dead period and are not directly responsive to the dial pulses.

Figures 6, 7, 8:
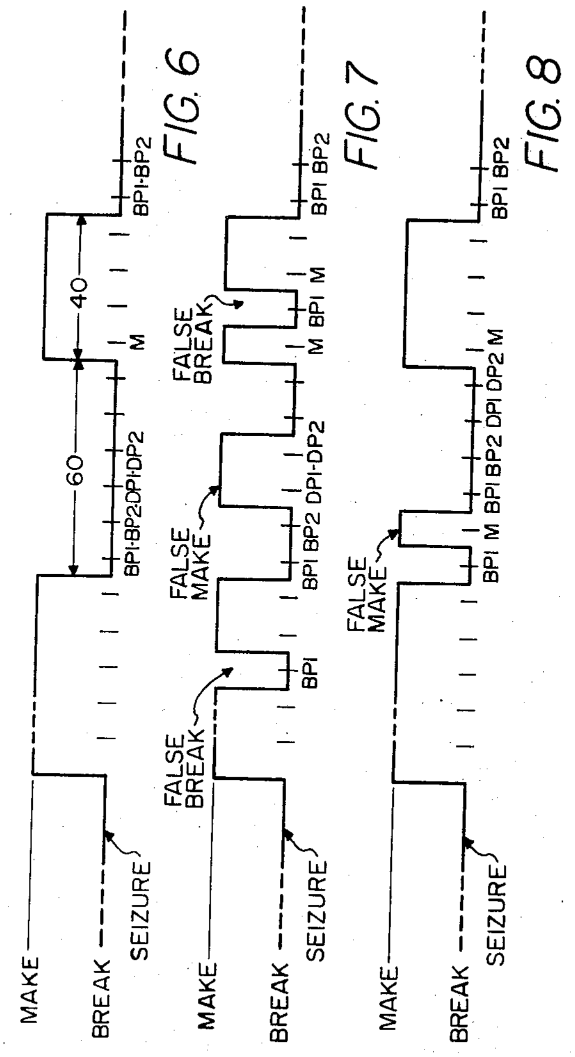
FIGS. 6–9 are pulse diagrams which are useful in understanding the operation of the ulse detection arrangement of the invention.

The output of the gate 16 serves to add one to the PAR field stored in positions I1-4 of row 2B of the memory as shown in FIG. 6 so that the dial pulses may be counted. The PAR field is an internal register-sender counter and buffer field used to register digits in the dial pulse mode of receiving and as a buffer for digits received in the dual tone (touch) calling multifrequency TCMF mode or in the MF mode of receiving. For the dial pulse mode, the PAR field is used to count dial pulses and provide buffer storage prior to placing the dial digit in the called or calling number section of the memory RCM. For TCMF and MF modes, the PAR field serves only as a buffer prior to transferring the digit to the called or calling number section of the memory. For a description of the logic for causing the PAR field to be written into the memory, reference may be made to Section K2c of the REGISTER-SENDER patent application. The following is a Boolean equation for advancing the count in the PAR field:

ADD1−PAR=(RJM−PH) (RRB−DP2) (RCB−FDC) (RRB−MDR=0) (RTG−Y2).

Figure 10:
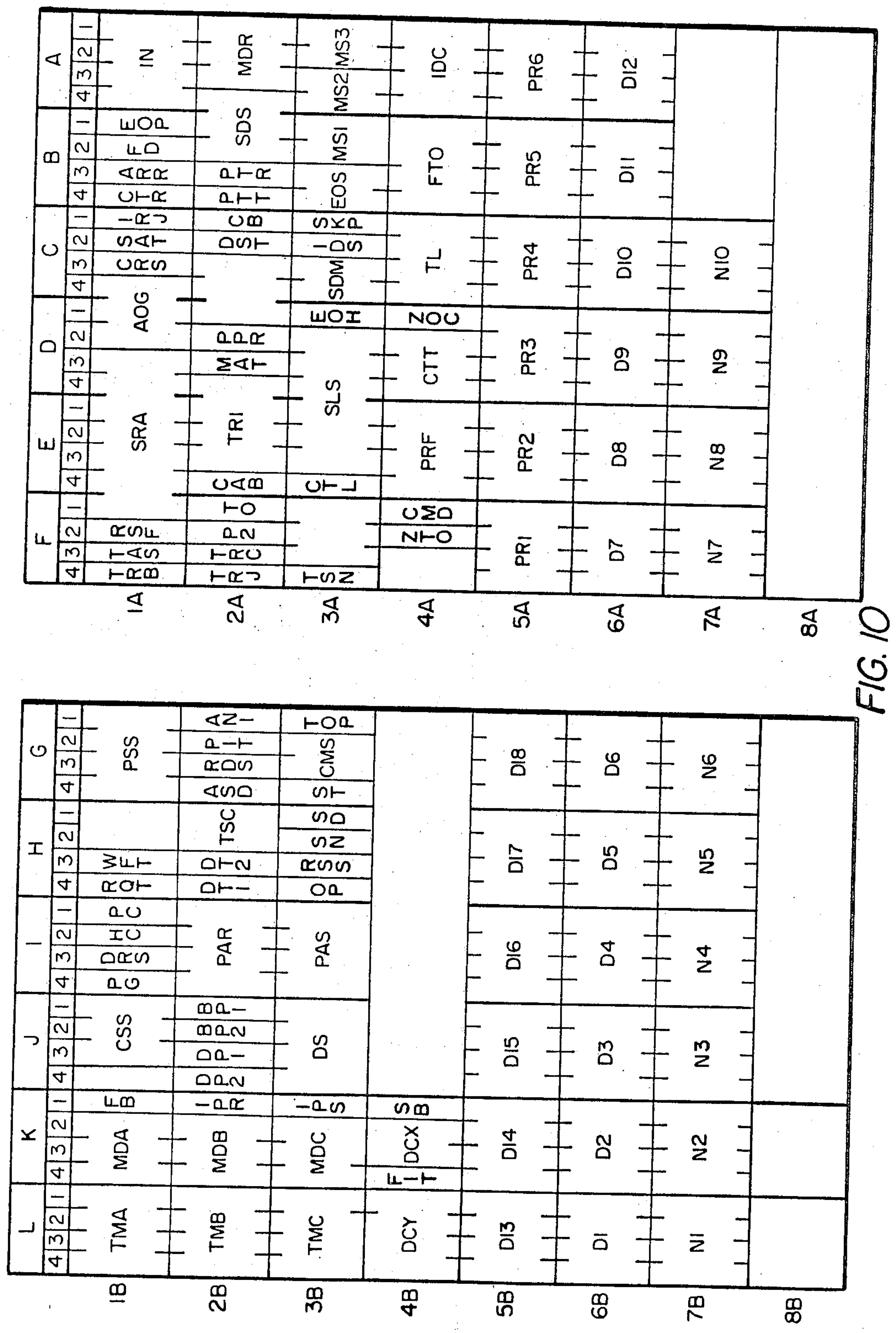
FIG. 10 is a chart showing the arrangement of information stored in the memory of the system shown in FIG. 2.
Figure 11:
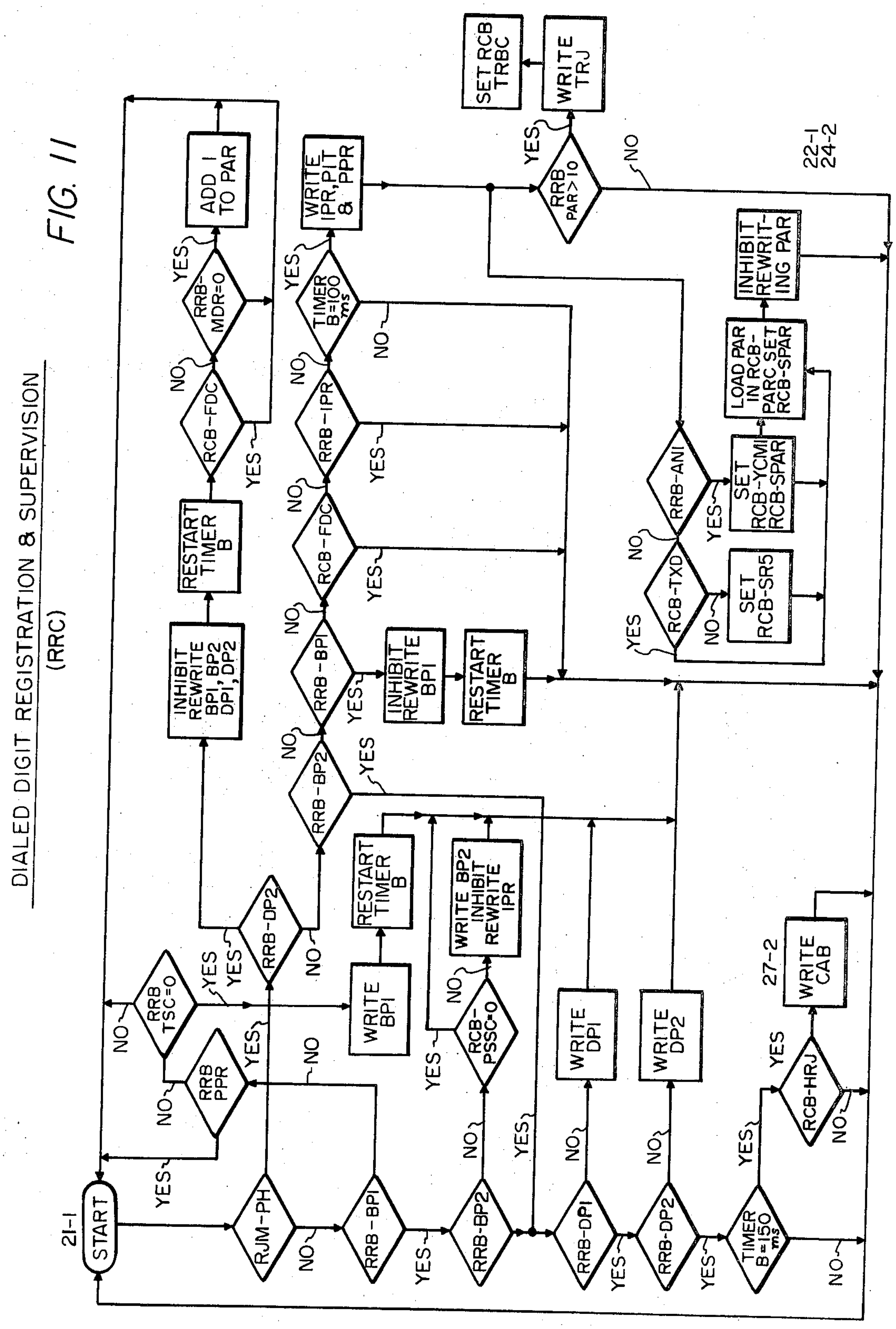
FIG. 11 is a flow chart showing the pulse detection operations of the system shown in FIG. 2.

As shown in FIG. 1 of the drawings, the output of the gate 10 is also connected to a signal lead START TIMER (TIM) for restarting timer B of the timer field TMB and its control field MDB, which are stored in the respective positions L1-4 and K2-4 of row 2B of the memory, as shown in FIG. 10. The information START TIMER (TIM) indicates TMB=1 and MDB=0. The timer B insures that a make condition is detected within 150 milliseconds following the storing of the information DP2 in the memory, and if it is not so detected, then if the register junctor is still holding, the call will be considered to be abandoned. As shown in the lower left-hand portion of the chart of FIG. 11, if RRB−DP2 is true and TIMER B=150ms, then the information CAB will be written in position E4 of row 2A of the memory (FIG. 10) to cause subsequently an interrupt to be generated for the purpose of informing the data processing unit that the call has been abandoned. Also, the timer B determines an interdigital pause interval by causing the information IPR indicative of such a pause to be written in position K1 of row 2B of the memory (FIG. 10) following the first indication of a make period. Thus, as shown in the chart of FIG. 11, if RJM-PH is true, and if RRB-DP2, RRB-BP2, RRB-BP1, RCB-FDC (finish dialing), and RRB-IPR are not true, then IPR, PIT (perform interdigital timing) and PPR will be written into the memory when TIMER B=100msec.

For additional information concerning the timers, reference may be made to the REGISTER-SENDER patent application, and also to a co-pending U.S. patent application, entitled SENDER PULSE TIMING CONTROL, by S. E. Puccini and G. O'Toole, Ser. No. 214,621, filed Jan. 3, 1972.

The output of the gate 12 is also connected to a signal lead INHIBIT WRITE IPR which indicates inhibiting of the writing of the interdigital pause-receiving information stored in position K1 of row 2B of the memory (FIG. 10). The IPR information is set when a digit has been received and has been or is being stored into the memory, and it is cleared when the next digit begins register. The information IPR is written into the memory in accordance with the following equation:

WRITE IPR=(RJM−PH) (RRB−J1) (RCB−FDC) (RRB−IPR) (TIM=100MSEC) (RTG−Y2)

For additional information concerning the IPR information, reference may be made to the REGISTER-SENDER patent application.

The bit of information designated CAB (call abandoned) also utilizes a signal (generated in response to the gate 16) produced by the logic circuitry shown in FIG. 1. The information CAB is explained in some detail in the REGISTER-SENDER patent application, and is generated by the following equation:

WRITE CAB=(RJM−PH) (RRB−DP2) (TIM=150MSEC) (RTG−Y2) (RCB−HRJ)

Referring now to FIG. 6 of the drawings, there is shown a chart which illustrates the manner of detecting a dial pulse in accordance with the present invention. The dial pulse train shown in FIG. 6 is a nominal or desirable pulse train of a 60 percent break pulse ratio and of a frequency of 10 pulses per second produced at the contacts of the battery feed relay 10A. The series of equally-spaced lines spaced apart by 10 milliseconds indicate the occurrences of the sample times. It should be noted that a valid impulse, which in the preferred embodiment of the present invention is a break interval, is determined by the two break samples BP1 and BP2 followed by the two consecutive dead periods DP1 and DP2, which in turn must be followed by a make indication within 100 milliseconds as determined by the timer B.

As shown in FIG. 7, false make and break pulses occurring before, during, and after a nominal duration impulse are rejected as being spurious pulses by the arrangement of the present invention. The false break periods are not recognized because they are not sufficiently long in duration to be sampled twice. The fals make condition is not recognized because it occurred during the dead periods.

As shown in FIG. 8, a false make condition occurring immediately following a BP1 indication is not recognized because it is not preceded by two break samples.

Figures 9, 9A, 9B:
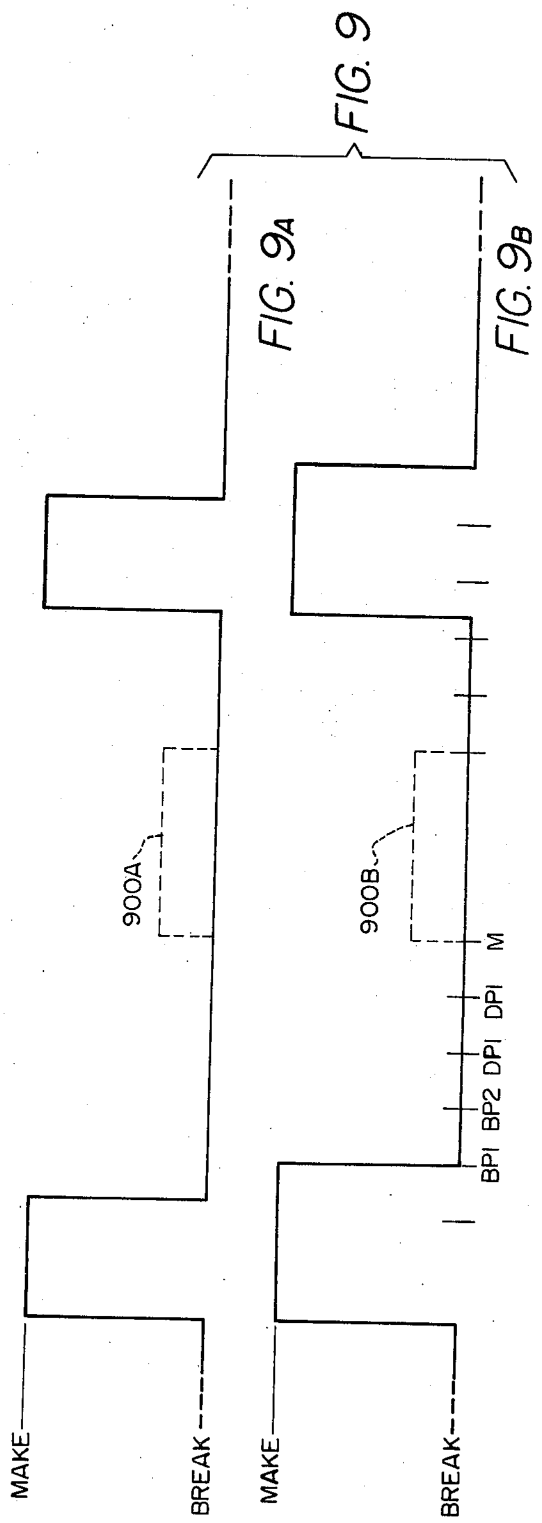

FIG. 9A illustrates the pulse condition which occurs at the input to the battery feed relay 10A when a line is encountered with a pulsing speed of eight pulses per second and an 83 percent break ratio is present. Such a condition is only rarely encountered, but in such circumstances, false pulses would be detected erroneously with the arrangement of the present invention should the leading edge of the false pulse fall within the area designated 900A and should a sampling time fall within its time span. FIG. 9B illustrates the pulse condition repeated by the contacts of the relay 10A, the difference between the two waveforms being caused by the operate and release times of the relay 10A. As indicated by the sample marks shown in FIG. 9B, a false make condition occurring during the period 900B corresponding to the period 900A would be erroneously detected. However, it has been discovered that false pulses rarely occur except near the transitions between make and break conditions, and thus they do not ordinarily occur during the interval 900B. Moreover, the battery-feed relay, as mentioned in the foregoing description, does not respond to short-duration false pulses, and thus such pulses occurring during the unguarded interval 900B would not be detected. Thus, while an unguarded interval does exist, the probability of erroneously detecting a false pulse occurring during such a time interval and during this type of infrequent pulse train is highly remote.

Referring now to the drawings with particular reference to FIG. 11 thereof, in operation, with a rotary dial at a local subscriber station, or incoming dial pulse signaling via a trunk, the line loop to the register junctor via leads R0 and TO (FIG. 3) when closed operates relay 10A, which applies a signal to the lead PHM via the multiplex circuits, detected in the common logic as a true signal RJM-PH. This signal condition is the make period during dialing. When the line loop to the register junctor via leads R0 and T0 is opened (the break period) relay 10A releases, and via lead PHM and the multiplex circuits the signal condition RJM-PH in the common logic circuits become false. The dialed digit registration and supervision is shown in FIG. 11. As long as the line loop is closed and RJM-PH is true, no action has occurred as may be followed on the flow chart by PH yes, DP2 no, BP2 no, BP1 no, FDC no, IPR no, timer B=100 milliseconds no. At the beginning of a break period the conditions are RJM–PH not true, BP1 not true, and if no coin or party test has been initiated TSC=0 true; which with the gates 10, 18 and 20 of FIG. 1 writes the signal BP1 into memory (bit J1 of word 2B) and restarts timer B during sub-time slot Y2. In sub-time slot Y2 of the next cycle the conditions are RJM-PH not true, BP1 true, and BP2 not true, and also PSSC=10 is not true; which with gates 12, 24 and 26 writes condition BP2 in memory (bit J2 of word 2A), and inhibits the writing of IPR (bit J1 of word 2B). In sub-time slot Y2 of the next cycle gates 14, 28 and 31 cause the writing of conditions DP1 (bit J3 of word 2B); and in the cycle after that gates 16, 23 and 35 cause the writing of condition DP2 (bit J4 of word 2B).

As shown in FIG. 11 the dial pulses occurring as break intervals of the line loop detected as false periods of RJM-PH are recorded by writing BP1, BP2, DP1 and DP2 in successive cycles. Once DP2 is written indicating at least 30 milliseconds, the timer B is restarted. If RJM-PH does not go true within 50 milliseconds CAB (call abandoned) is written (bit E4 of word 2A), which causes an interrupt, etc.

If PH does go true within the 150 milliseconds BP1, BP2, DP1 and DP2 are cleared by means of gate 22, timer B is restarted, and the common logic adds 1 to the PAR field (pulse accumulator-receiving, bits I1-4 of word 2B).

With RJM-PH true and $\overline{\text{DP2}}$ the make period of the dial is timed. If RJM-PH goes false within 100 milliseconds the above steps are repeated for the next pulse. If RJM-PH remains true beyond 100 millisecond interval, IPR (interdigital pause in receiving), and PIT (perform interdigital timing) in bits K1 and G2 are written using RRC equations 7 of Section K of the REGISTER-SENDER patent application, ROW 2-K1 and ROW 2-G2 of the memory (FIG. 10).

Once the complete digit has been accumulated two actions are taken. The PAR field is decoded to insure that the digit is not greater than 10. if it is TRJ (trouble in register junctor) is called by writing bit F4 of the word 2A using RRC equation 8 and ROW 2-F4 of the REGISTER-SENDER patent application. The RRC equation of the REGISTER-SENDER patent application RRC-SET-TRBC causes the carry buffer latch TRBC to be set, which in turn during sub-time slot Y9 causes the condition to be written into bit F4 of row 1 using RPC equation ROW 1-F4 of the REGISTER-SENDER patent application.

The other action upon accumulation of a complete digit is to store the digit into memory. Here a decision is required as to where the digit is to go. If ANI is being received, the digit goes into row 7. If 12 digits have already been received it goes into row 5, if TXD has been set this indicates that the digit should transfer over row 5 and go into row 6. Regardless of which row the digit goes into, RRC equation 7 being true causes the carry buffer latch SPAR to be set, and the four carry buffer latches PARC-1, 2, 4, 8 to be selectively set respectively in accordance with the value of this digit in the PAR field bits I1-4. Also the PAR field is cleared.

With the digit stored in the carry buffer, it is ready to be loaded into the memory. For an explanation of the loading of digits into the memory, reference may be made to the REGISTER-SENDER patent application.

It is to be understood that the above-described embodiment of the present invention is but one illustration of the application of the principles of the invention. Numerous modifications and other arrangements may be devised by those skilled in the art without departing from the spirit and scope of the invention.

I claim:

1. In a communication switching system in which digits are received on a line in the form of alternating first and second conditions, the first condition being a normal condition, and each digit being represented as a series of impulses of the second condition;

a digit receiver connected to the line for receiving digits, scanning means coupled to sample said first and second conditions at the digit receiver during sampling times occurring at periodic intervals;

a plurality of recording devices individual to each digit receiver, said devices including a second-condition count set; a "dead-period" count set, a timing set, and a pulse accumulator set;

timing means comprising timing circuits and said timing set to record a time value in the timing set, with the timing circuits including means to start the timing means by setting the time value to an initial value and means to advance the time value during sampling times for the digit receiver;

detecting means comprising gate means coupled to the scanning means and to the recording devices, with means effective during a sampling time for the digit receiver in which the second-condition occurs with a count value in the second-condition count set less than N to add one to the count value in the second-condition count set and to start the timing means if the value in the second-condition count set is zero, with means effective during a sampling time in which the count value in the second-condition count set is equal to N and a count value in the "dead-period" count set is less than M to add one to the count value in the "dead-period" count set, with means effective during a sampling time in which the first condition occurs before the time value has reached a predetermined value and the count value in the "dead-period" count set is equal to M to reset the count values to zero in the second-condition count set and the "dead-period" count set and to add one to the count value in the pulse accumulator set, whereby a valid impulse is recorded responsive to N samples indicating the second condition followed by M sample periods of either condition, and at least one sample indicating the first condition within a predetermined time interval;

said detecting means further including means effective during a sampling time in which the first condition occurs with a count value in the second-condition count set greater than zero and less than N to reset the value to zero in the second condition count set and to start the timing means, this being an invalid impulse.

2. In a communication switching system, the combination as claimed in claim 1, wherein impulses of a digit occur at a nominal rate of 10 impulses per second, wherein the scanning rate is approximately 10 milliseconds per sample, and wherein N is two and M is two.

3. In a communication switching system, the combination as claimed in claim 1, wherein the digit receiver comprises a relay having winding means connected to the line and contacts coupled to the scanning means.

4. In a communication switching system, the combination as claimed in claim 3, wherein direct current power is supplied to the line via the winding means of the relay, the first condition comprises flow of direct current which operates the relay, the second condition comprises interruption of the direct current to release the relay, and wherein short interruptions do not cause the relay to release.

5. In a communication switching system, the combination as claimed in claim 4, wherein impulses of a digit occur at a nominal rate of 10 impulses per second with limits of eight to 12 impulses per second, wherein the scanning rate is approximately 10 milliseconds per sample, wherein N is two and M is two, and wherein said short interruptions are of approximately 2 milliseconds or less.

6. In a communication switching system, the combination as claimed in claim 1, wherein the system includes register apparatus comprising a plurality of register junctors, common digital processing circuits which include said detecting means and timing circuits, a memory, a timing generator, and junctor multiplex circuits;

wherein each register junctor includes one of said digit receivers;

said memory comprises a plurality of storage elements, with a block of storage elements individual to each register junctor, wherein said recording devices are storage elements included in each block;

said timing generator includes means to supply cyclically recurring time slot signals, each register junctor having an individual time slot, with the time slot signals supplied to the memory and to the junctor multiplex circuits, means effectively coupling the register junctors during their respective time slots via the junctor multiplex means to the common digital processing circuits, means to read each block of memory during the time slot of its register junctor and to supply the information therefrom to the common digital processing circuits, and means to write information from the common digital processing circuits into the block of memory later during the time slot;

wherein said scanning means includes said timing generator and said junctor multiplex circuits.

7. In a communication switching system, the combination as claimed in claim 6, wherein impulses of a digit occur at a nominal rate of 10 impulses per second, wherein the scanning rate is approximately 10 milliseconds per sample, and wherein N is two and M is two.

* * * * *